W. F. KRAUSE.
MECHANICAL CHRISTMAS TREE.
APPLICATION FILED MAY 11, 1915.
1,163,093.
Patented Dec. 7, 1915.
3 SHEETS—SHEET 3.
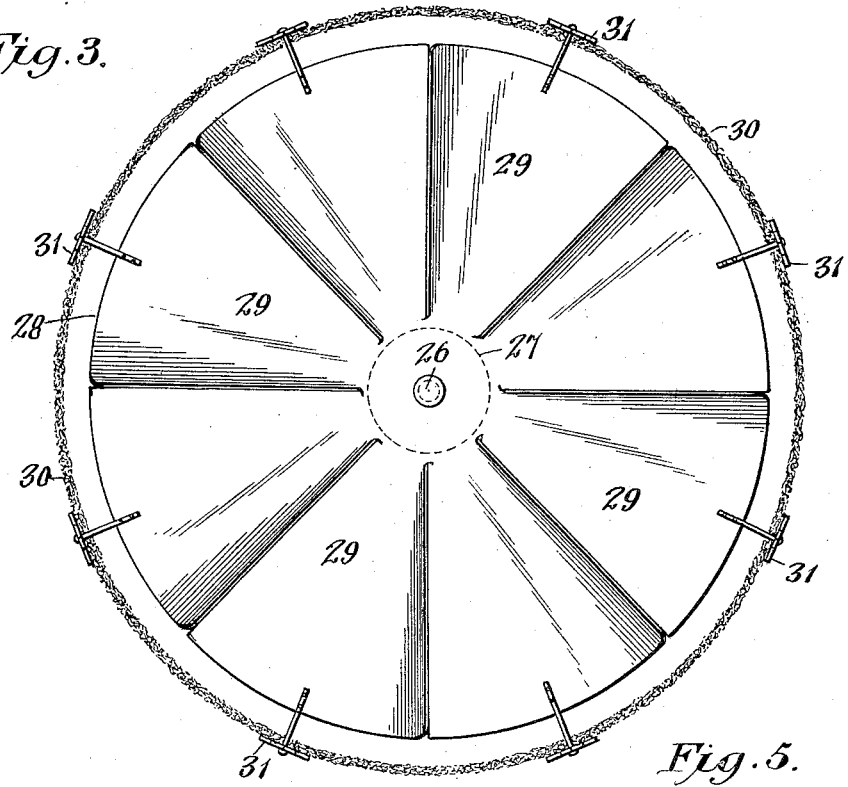
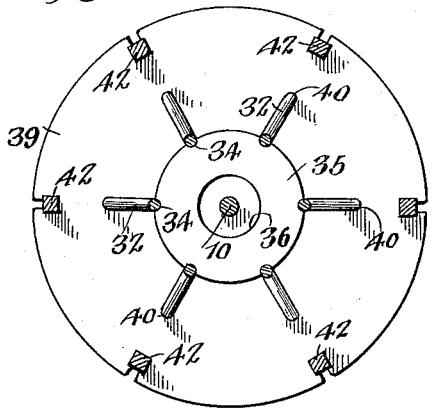
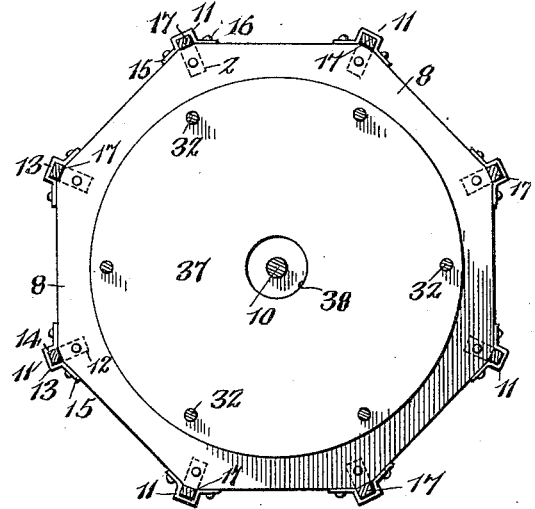
William F. Krause, Inventor

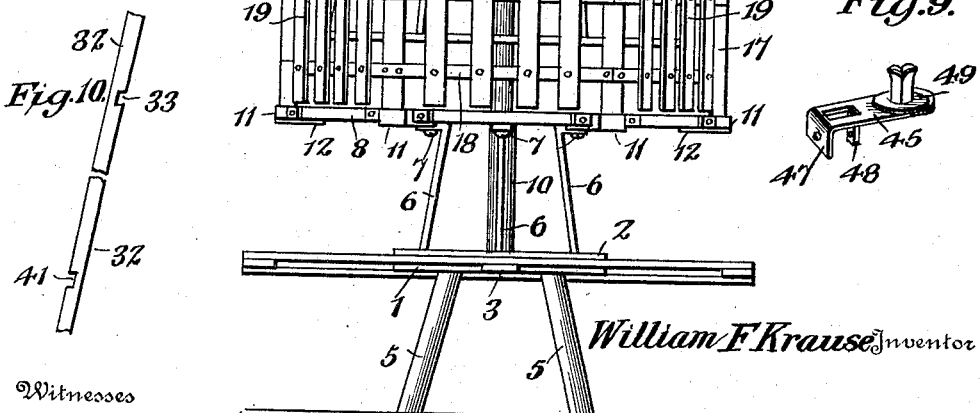

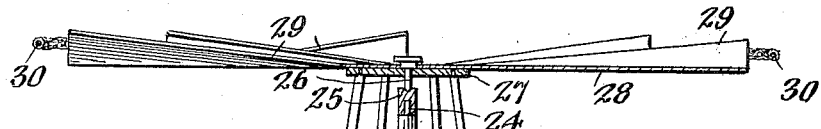
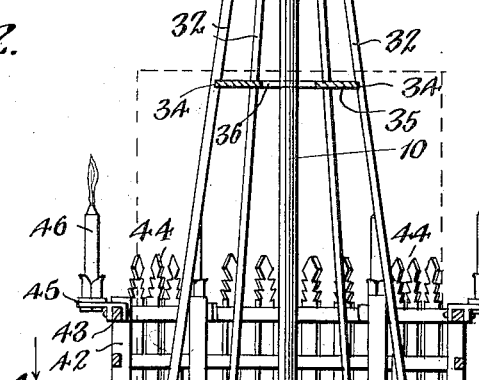
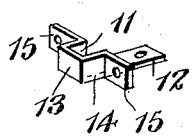
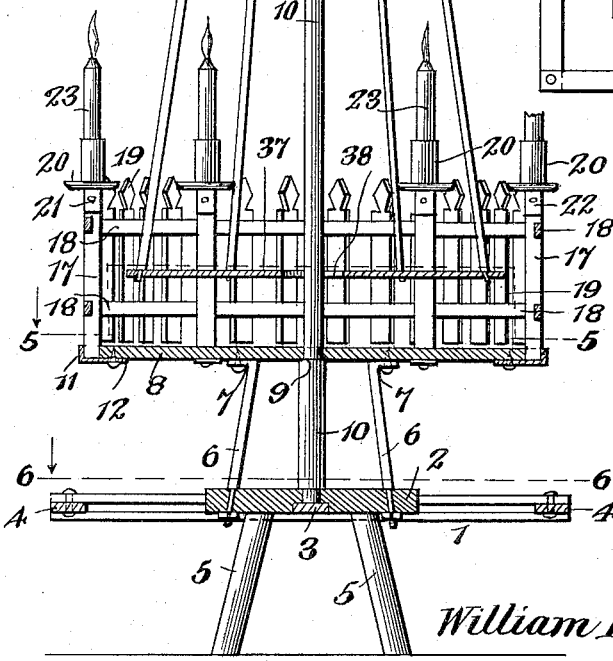

UNITED STATES PATENT OFFICE.

WILLIAM F. KRAUSE, OF FOND DU LAC, WISCONSIN.

MECHANICAL CHRISTMAS TREE.

1,163,093.   Specification of Letters Patent.   Patented Dec. 7, 1915.

Application filed May 11, 1915.   Serial No. 27,438.

*To all whom it may concern:*

Be it known that I, WILLIAM F. KRAUSE, a citizen of the United States of America, residing at Fond du Lac, in the county of Fond du Lac and State of Wisconsin, have invented certain new and useful Improvements in Mechanical Christmas Trees, of which the following is a specification, reference being had therein to the accompanying drawing.

This invention relates to mechanical Christmas trees and has for its object the production of a simple and efficient mechanical Christmas tree, whereby the heat rising from the candles carried thereby will cause the tree to rotate.

Another object of this invention is the production of a simple and efficient mechanical Christmas tree, the parts of which may be readily and conveniently assembled.

A still further object of this invention is the production of a simple and efficient mechanism which is simple in construction and consists of a minimum number of parts.

With these and other objects in view this invention consists of certain novel combinations, constructions, and arrangements of parts as will be hereinafter fully described and claimed.

In the accompanying drawings:—Figure 1 is a side elevation of the tree. Fig. 2 is a central vertical section thereof. Fig. 3 is a top plan view of the propeller wheel. Fig. 4 is a section taken on line 4—4, of Fig. 2. Fig. 5 is a section taken on line 5—5, of Fig. 2. Fig. 6 is a miniature sectional view taken on line 6—6, of Fig. 2. Fig. 7 is a vertical section through one of the candle holders carried by the lower platform. Fig. 8 is a vertical sectional view through one of the candle holders carried by the upper platform. Fig. 9 is a perspective view of the candle holder illustrated in Fig. 8. Fig. 10 is an enlarged fragmentary side elevation of one of the radiating rods. Fig. 11 is a perspective view of one of the socket brackets carried by the lower platform for supporting the fence. Fig. 12 is a plan view of the blank from which the socket member illustrated in Fig. 11 is made.

By referring to the drawings it will be seen that 1 designates the base of the tree which comprises a supporting block 2 having radiating arms 3 secured thereto, which arms in turn support a rectangular frame 4 at their outer ends upon which any desired or suitable decoration may be placed. The supporting plate 2 is in turn supported by the legs 5 as illustrated in Fig. 1.

A plurality of bracket arms 6 are secured to the base plate 2, and have their laterally bent ends 7 secured to the under face of the lower platform 8. This lower platform 8 rests upon the shoulder 9 formed upon the central supporting shaft 10. The platform 8 is formed octagonal in shape, although any other or desired shape may be employed without departing from the spirit of the invention. A metallic socket plate 11 is secured to each corner of the platform 8 as illustrated in Fig. 5, and each socket plate comprises an inwardly extending tongue 12, which tongue is provided with an upwardly struck lip 13 terminating in a pair of rearwardly extending parallel side lips 14, which lips in turn terminate in laterally extending ears 15. The ears 15 are secured to the edges of the platform 8 by means of rivets or other securing means 16. It will, therefore, be seen that a socket will be formed at each corner of the supporting platform 8 within which the brace standards or corner posts 17 of the fence which is supported by the platform 8 may be secured.

The fence which is supported by the platform 8 comprises as stated above a plurality of corner posts 17, which corner posts are connected by means of the horizontal rails 18, and these rails support the pickets 19 which may be of any desired or suitable shape. A candle holder 20 is supported upon each corner post 17, and each candle holder 20 is provided with a downwardly extending collar 21 for fitting over the rounded upper end 22 of the corner posts 17. A candle 23 is then placed in each of the candle holders 20.

The standard or shaft 10 is provided with a reduced extension 24 at the upper end thereof upon which is mounted a glass cap 25. This glass cap 25 receives the lower end of the pin 26, which pin 26 is carried by the upper disk 27 illustrated in Figs. 1 and 2. A fan or propeller 28 is secured to the upper disk 27 and is provided with a plurality of radiating blades 29. A strand 30 passes around the outer ends of the blades 29 formed of tinsel or other suitable decoration and stars are supported at predetermined points around the edge of the propeller 28.

A plurality of converging rods 32 are secured to the under face of the disk 27, and these rods 32 are provided with notches 33 upon the inner face thereof for the purpose of receiving the notches 34 formed in the bracing disk 35. The bracing disk 35 is provided with a centrally located aperture 36 which is considerably larger than the standard 10 to permit the propeller-carrying frame to readily rotate around the standard or shaft 10. The lower ends of these converging rods 32 engage a disk 37, which disk is provided with an enlarged aperture 38 fitting around the standard or shaft 10.

An upper platform 39 is supported upon the converging rods 35 by having the edges of the apertures 40 formed therein fitting into the notches 41 formed in the outer face of the converging rods 32, thereby constituting an efficient support for the platform 39 without the necessity of employing additional supporting means.

A plurality of fence posts 42 are secured to the platform 35, and these posts 42 engage the horizontal rails 43 upon which rails are secured the pickets 44.

A plurality of candle holding brackets 45 are secured to the rails 43 in spaced relation for the purpose of supporting the candles 46. The brackets 45 are preferably struck from one blank sheet of metal as illustrated in Figs. 8 and 9, and each bracket comprises a downwardly extending flange 47 and a downwardly struck tongue 48.

A candle engaging clip 29 is secured in the outer apertured end of the bracket 45 by having its ends 50 clenched under the lower face thereof for conveniently supporting the candle engaging clip 49. It should be understood that the downwardly extending tongues or lips 47 and 48 are adapted to straddle upon the opposite sides of the horizontal rails 43 and receive securing means such as a pin or other suitable means for securing the brackets conveniently thereto.

The operation of the device is as follows:—The candles 23 are lighted and also the candles 46, and the heat rising from the candles 23 will engage the propeller 28 and cause the same to rotate, thereby carrying the supporting frame which comprises the converging rods 32, the lower disk 37, the upper disk 27 and propeller 28 and also the upper platform 39. As the frame thus continues to rotate, the currents of heated air rising from the candles 46 will assist in driving the fan 28.

Of course, it should be understood that any suitable decorations as now employed upon trees and the like may be placed upon the tree in any desired manner, such as for instance decorations may be hung from the pickets carried by the upper and lower platforms.

Having thus described the invention what is claimed as new, is:—

1. A device of the class described comprising a support, a standard carried thereby, a platform carried by said support, a frame comprising an upper disk, a pivot pin engaging said standard for pivotally supporting said frame upon said standard, a plurality of supporting rods converging toward the upper end thereof and engaging said upper disk, a lower disk engaging the lower ends of said rods, a second platform, said second platform provided with a plurality of apertures formed therein, said rods provided with notches upon the outer face thereof for fitting in said apertures and constituting a support for said second platform, said rods provided with notches upon the inner faces thereof and near the top thereof, a bracing disk engaging said notches and constituting an internal brace therefor, a propeller carried by said frame, and heating means carried by said platform for discharging currents of heated air against said propeller for rotating said frame.

2. A device of the class described comprising a support, a standard carried by said support, a frame rotatably mounted upon said standard, a propeller carried by said frame, a platform carried by said support and stationary thereon, candles supported upon said platform, a second platform carried by said frame, said frame adapted to rotate upon said standard, candles carried by said second platform, and heating means carried by said first-mentioned platform for discharging currents of heated air against said propeller for driving the same.

3. A mechanical Christmas tree comprising a base, a standard, a platform supported upon said standard, said platform provided with a plurality of metallic socket members secured thereto, posts fitting within said socket members, rails connecting said posts, pickets carried by said rails, candle stick holders carried by said posts, candles carried by said candle stick holders, a frame carried by said standard, a propeller carried by said standard, and said candles when lighted adapted to discharge currents of heated air against said propeller for driving said propeller.

In testimony whereof I hereunto affix my signature in presence of two witnesses.

WILLIAM F. KRAUSE.

Witnesses:
 MAURICE MCKENNA,
 EDWARD M. MCGOWAN.

Copies of this patent may be obtained for five cents each, by addressing the "Commissioner of Patents, Washington, D. C."